United States Patent

Wieck

[11] Patent Number: 6,011,967
[45] Date of Patent: Jan. 4, 2000

[54] CELLULAR TELEPHONE ALARM

[75] Inventor: Christopher P. Wieck, La Jolla, Calif.

[73] Assignees: Sony Corporation, Tokyo, Japan; Sony Electronics, Inc., Park Ridge, N.J.

[21] Appl. No.: 08/861,222

[22] Filed: May 21, 1997

[51] Int. Cl.[7] .................................................. H04Q 7/20
[52] U.S. Cl. ........................ 455/404; 455/422; 455/564; 455/575
[58] Field of Search .................................. 455/404, 422, 455/67.1, 550, 557, 564, 575, 115; 340/539; 379/37, 38, 40

[56] References Cited

U.S. PATENT DOCUMENTS

| | | | |
|---|---|---|---|
| 5,144,661 | 9/1992 | Shamosh et al. | 340/540 |
| 5,218,367 | 6/1993 | Sheffer et al. | 379/59 |
| 5,319,698 | 6/1994 | Glidewell et al. | 379/39 |
| 5,412,708 | 5/1995 | Katz | 379/39 |
| 5,517,683 | 5/1996 | Collett et al. | 455/575 |
| 5,568,535 | 10/1996 | Sheffer et al. | 379/39 |
| 5,742,233 | 4/1998 | Hoffman et al. | 340/573.1 |

*Primary Examiner*—Wellington Chin
*Assistant Examiner*—Yemane Woldetatios
*Attorney, Agent, or Firm*—Frommer Lawerence & Haug, LLP; William S. Frommer

[57] ABSTRACT

Cellular telephone which operates as an alarm in an alarm mode. After or prior to being manually or automatically set in the alarm mode, the cellular telephone receives a sensor signal which identifies the occurrence or non-occurrence of a predetermined event. Upon receiving a signal that indicates the occurrence of a predetermined, usually undesirable, event, the cellular telephone automatically establishes a channel of communication with a pre-programmed telephone number, transmits to the called number identification data that identifies the cellular telephone, and then establishes the cellular telephone in a particular alarm operating mode, for example, a two-way audio mode.

4 Claims, 4 Drawing Sheets

CELLULAR TELEPHONE ALARM

BACKGROUND OF THE INVENTION

The present invention relates to a cellular telephone alarm and, more particularly, to a cellular telephone operating as an alarm with means for detecting the occurrence of a predetermined event and for communicating the occurrence of the predetermined event to a called telephone number.

Currently, there are many types of alarm systems which sound an audio alarm upon detection of one or more predetermined events. These alarms protect the security of homes, automobiles, businesses, etc. and often alert police or other security companies of an unlawful entrance of the premises. Providing sensors on doors, windows and other areas of the property to be protected offer the means by which these alarm systems operate, such sensors being hardwired or in radio communication with an alarm control panel which operates as the central processing unit of the alarm system.

One problem, however, with current alarm systems is their general high cost which includes the cost of the alarm components and the cost of installation of the sensors and the central processing unit (or "main control panel"). Another problem with current alarm systems is that they generally are permanently installed to a particular structure, such as a house or car and, thus, are not portable.

OBJECTS OF THE INVENTION

Therefore, it is an object of the present invention to provide a cellular telephone alarm which overcomes the shortcomings of existing alarm systems.

Another object of the present invention is to provide a cellular telephone alarm that is operable to be utilized as an alarm system and which may be utilized also as a regular cellular telephone.

A further object of the present invention is to provide a cellular telephone alarm having alarm capabilities not possible by typical alarm systems.

Various other objects, advantages and features of the present invention will become readily apparent to those of ordinary skill in the art, and the novel features will be particularly pointed out in the appended claims.

SUMMARY OF THE INVENTION

In accordance with an embodiment of the present invention, a cellular telephone is provided to operate as an alarm by receiving a sensor signal which represents the occurrence of a predetermined event, establishing either manually or automatically the cellular telephone in an alarm mode, thereafter establishing a radio channel with a predetermined telephone number, transmitting to the predetermined telephone number identification data that identifies the cellular telephone to the called number, and then establishing the cellular telephone in a particular alarm operating mode.

As one aspect of the present invention, an audio signal received by a microphone of the cellular telephone is transmitted to the called telephone number.

As another aspect of the present invention, audio data representing an audio signal (e.g., a verbal warning) is received from the called number, and the received audio signal is supplied to a speaker of the cellular telephone or to an external speaker.

As yet a further aspect of the present invention, a video signal representing a video image of a particular location is externally received (e.g., from a camera) and transmitted to the called telephone number.

As yet another aspect of the present invention, the established channel is disconnected, the next received call is automatically answered without ringing, and the cellular telephone is set in a designated alarm operating mode after the call is answered automatically.

Still yet a further aspect of the present invention, a channel of communication is established with a second predetermined telephone number when the cellular telephone cannot establish a channel of communication with the first called number.

Still yet another aspect of the present invention, the cellular telephone is set automatically in the alarm mode when an input terminal of the cellular telephone receives an input jack that supplies the sensor signal that identifies the occurrence or non-occurrence of the predetermined event.

As a further aspect of the present invention, it is determined, when the cellular telephone is in the alarm mode, if the cellular telephone is moved, and in response to detected movement, the cellular telephone remains in radio communication with a cellular network without providing an indication to a possessor so as to allow the location of the cellular telephone to be tracked.

BRIEF DESCRIPTION OF THE DRAWINGS

The following detailed description, given by way of example, and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 1:
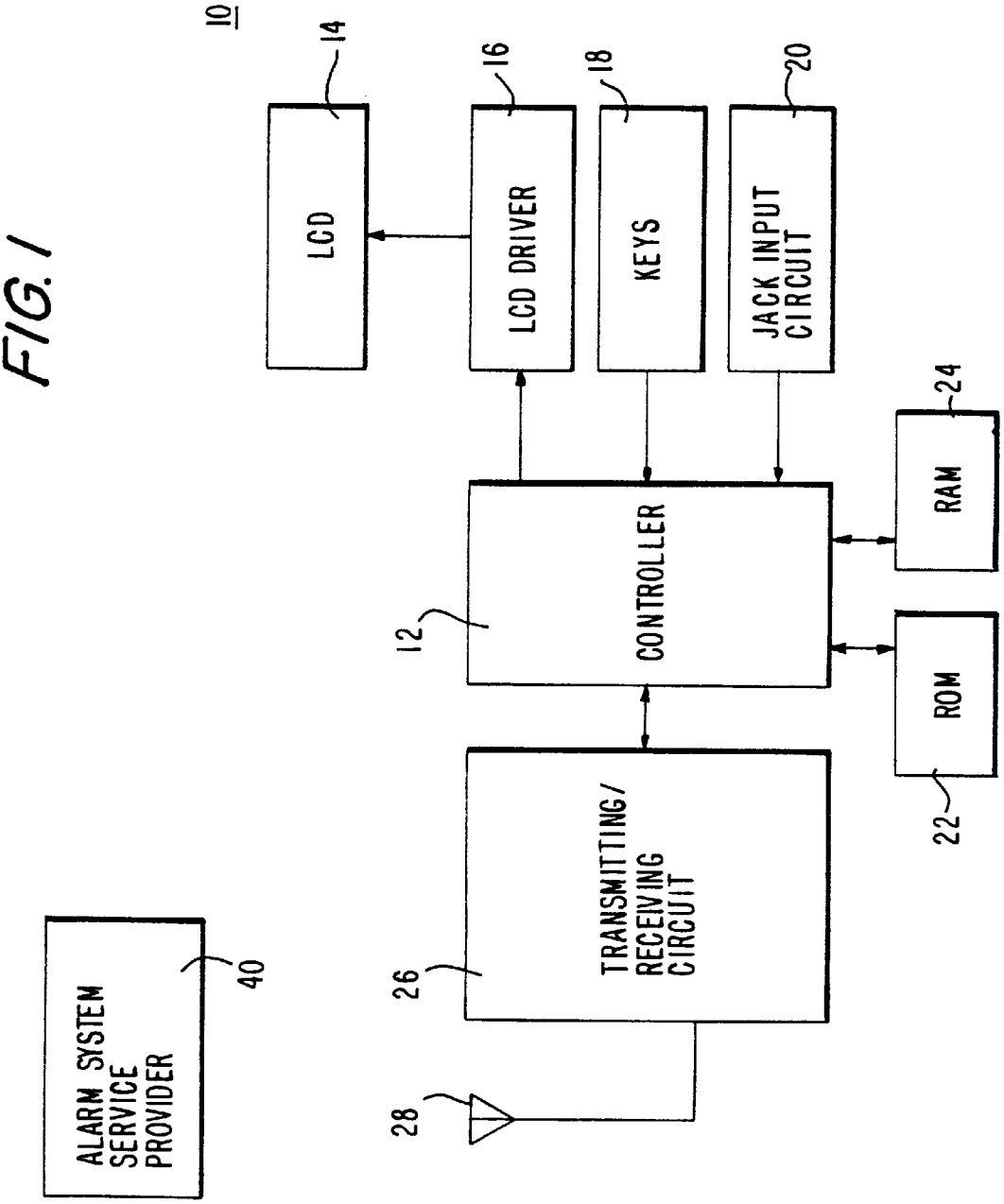
FIG. 1 is a block diagram of the cellular telephone alarm of the present invention.

Referring now to the drawings, FIG. 1 is a block diagram of cellular telephone 10 embodying the alarm of the present invention (also referred to herein as "cellular telephone alarm"). As shown, cellular telephone 10 is comprised of a controller 12, a liquid crystal display (LCD) 14, an LCD driver circuit 16, input keys 18, a jack input circuit 20, a read-only memory (ROM) 22, a random access memory (RAM) 24, a transmitting/receiving circuit 26, and an antenna 28. Controller 12 provides the means for carrying out most of the standard "phone" functions of cellular telephone 10 utilizing the permanently stored operation program stored in ROM 22 and using RAM 24 for storing temporary data. Controller 12 further provides, in conjunction with jack input circuit 20 and the source signal supplied thereto, for the operation of the cellular telephone alarm of the present invention (to be discussed). Input keys 18 provide the means by which a user of the cellular telephone enters numbers and other information. LCD driver 16 drives display 14 in response to control signals supplied from controller 12. Transmitting/receiving circuit 16 transmits and receives via antenna 28 RF signals to and from a cellular telephone base station (not shown). Since the particular construction and operation of display 14, LCD driver 16, transmitting/receiving circuit 26, antenna 28, ROM 22 and RAM 24 are well-known in the art, further description thereof is omitted herein, except where it is necessary for an understanding of the present invention. Also, although display 14 is described herein as being a liquid crystal display (LCD), other suitable displays may be used.

As will be further mentioned, while the present invention is described as pertaining to the operation of a cellular telephone, the present invention is not limited thereto and may easily be applied to other types of mobile devices including, but not limited to, a PCS device and a beeper.

Figure 2:
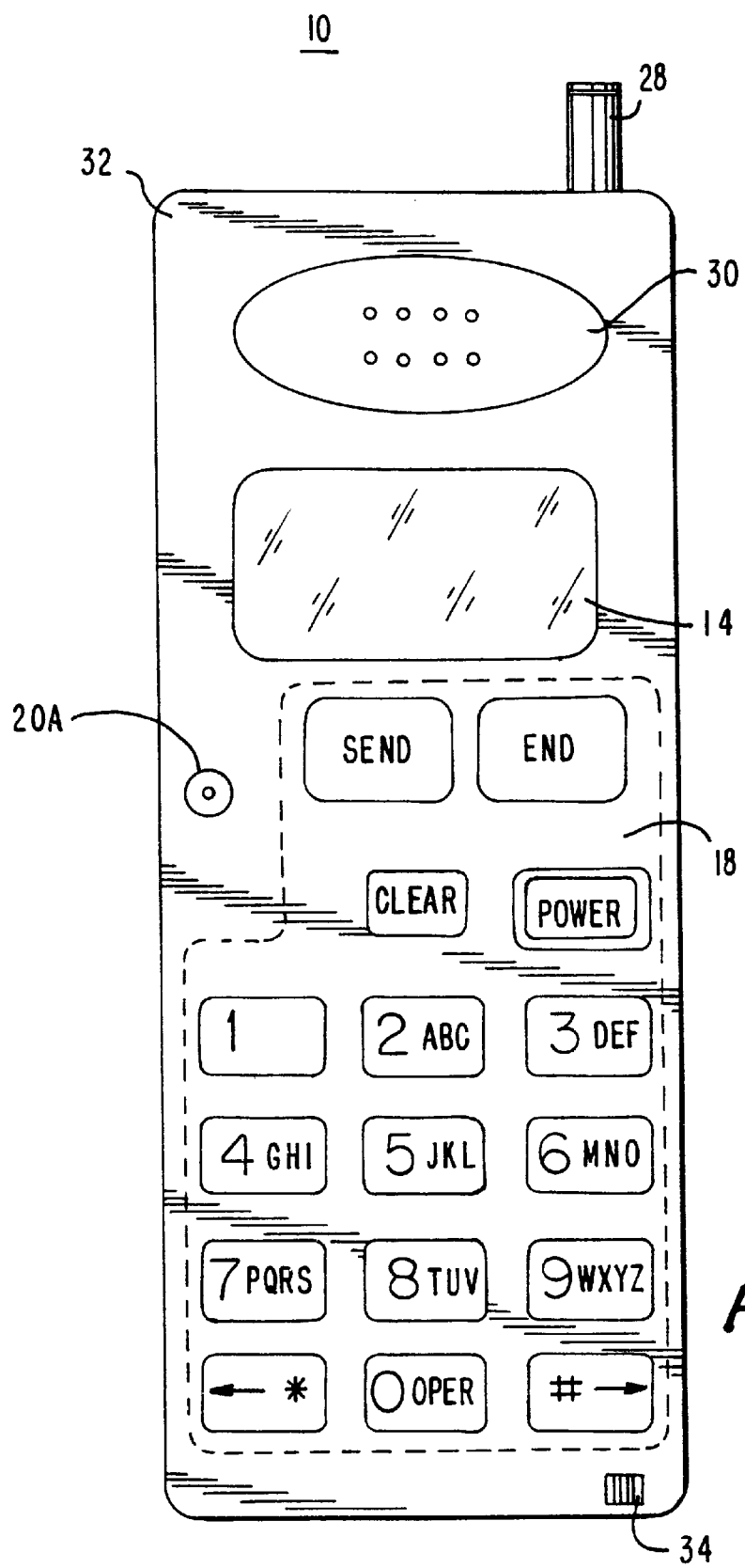
FIG. 2 is a schematic illustration of the face of cellular telephone 10.

FIG. 2 is a schematic illustration of the "face" 32 of cellular telephone 10 of the present invention and which is shown as being comprised of input keys 18, a jack input terminal 20A, display 14, and a speaker 30. Also shown, while generally not on the face, is antenna 28 which may be of the "pull-out" type. Face 32 of cellular telephone 10 also may include a microphone 34 into which a user speaks, although the microphone may be provided in a separate pull-out extension of the cellular telephone or in the "flip" cover thereof.

As shown in FIG. 2, input keys 18 include numeric input keys 0–9, a "#" key, an "*" key, a "SEND" key, an "END" key, a "CLEAR" key, and a "POWER" key. Input keys 18 may include other keys including memory recall keys, memory storage keys, a volume key, etc. Input keys 18 (and other keys not shown) exist on practically all cellular telephones and, thus, their respective functions and design are well-known in the art.

In accordance with the present invention, cellular telephone 10 includes jack input circuit 20 to which jack input terminal 20A is electrically coupled, which supplies to controller 12 an alarm signal (or signals) which indicates whether a predetermined event or events has occurred. Cellular telephone 10 may operate in a "standard" telephone mode in which it operates as a typical cellular telephone, and may also operate in a "alarm" mode in which the cellular telephone operates as an alarm system, to be further discussed. In the standard telephone mode, a user may send or receive telephone calls in the usual manner, may program the telephone (e.g., store telephone numbers therein) in a known manner, or perform any other function that may be performed by typical cellular telephones. Since the operation of cellular telephone 10 operating in the standard telephone mode is well-known in the art and forms no part of the present invention, further description thereof is omitted herein.

In accordance with the present invention, a user may set cellular telephone 10 to operate in alarm mode by means of entering any appropriate combination of keys including, for example, the depression of a function key (or other equivalent) followed by the depression of selected keys to enter the alarm mode. Since entering a particular mode of operation, for example, a telephone number storage mode, is well-known in the art, a particular example of how cellular telephone 10 is programmed to enter the alarm mode is not provided herein.

In an alternative embodiment, cellular telephone 10 automatically enters the alarm mode upon the insertion of an input jack into input terminal 20A (to be discussed).

In alarm mode (or prior to entering the alarm mode), the user inserts an input jack into jack input terminal 20A that is located on the face 32 of cellular telephone 10. It is noted that while terminal 20A is depicted as being located on the face of the cellular telephone of the present invention, terminal 20A may be located on any surface of the cellular telephone including any of the two sides, the bottom surface, the top surface or the rear surface.

Figure 3:
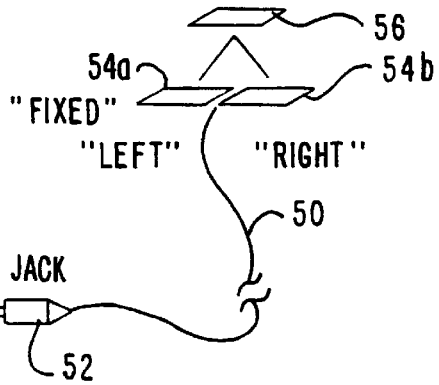
FIG. 3 is a schematic illustration of a sensing device used by the present invention.

The input jack that is inserted into terminal 20A is part of, or is coupled to, a sensing device which detects the occurrence of some predetermined event. For example, the sensing device may detect the occurrence of an open door, an open window, a broken window, etc., or any other desired event of which one desires to detect the occurrence. FIG. 3 is a schematic illustration of a sensing device that may be coupled to cellular telephone 10 of the present invention. As shown, sensing device (or sensor) 50 includes a jack 52 (e.g., a stereo or twin jack), fixed members 54A, 54B and a moving member 56. "Left" and "right" fixed members 54A and 54B each is electrically coupled to jack input circuit 20 of cellular telephone 10, wherein movement of member 56 causes electrical connection (or dis-connection) between fixed members 54A and 54B providing a short (or open) circuit to jack input circuit 20. Thus, an open circuit represents the non-occurrence of a predetermined event and a short circuit represents the occurrence of the predetermined event. Alternatively, an open circuit can represent the occurrence of the predetermined event and a short circuit can represent the non-occurrence of the predetermined event. In either case, sensor 50 supplies a feedback signal(s) indicating whether or not a predetermined event has occurred. For example, one signal (e.g., from member 54A) provides ground return which could be connected to auto-ground or home wiring ground, and the other signal (e.g., from member 54B) could provide an "alarm send" signal or "call" an "alarm send" function (to be discussed). As previously mentioned, sensor 50 may detect the opening of a door or window or other item, wherein fixed members 54A, 54B and movable member 56 are attached to particular parts of the door, window, etc.

In typical cellular telephones, the processor polls the keypad matrix with pulses and looks for a received pulse which is caused by the depression of a key which, in turn, shorts the two traces located beneath the key. Like the operation of the depression of an input key, the present invention provides for an alarm send function which is triggered upon the receipt of the short circuit (alternatively, an open circuit) supplied by sensor 50, previously discussed. That is, when sensor 50 detects the occurrence of a particular event, the alarm send function is activated, as further discussed below.

Figure 4A:
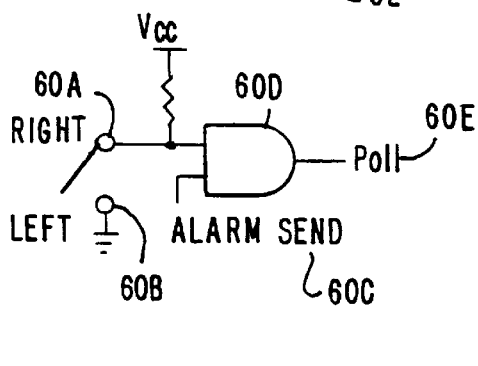
FIGS. 4A–4C are schematic circuit diagrams of jack input circuit 20 shown in FIG. 1.
Figure 4C:
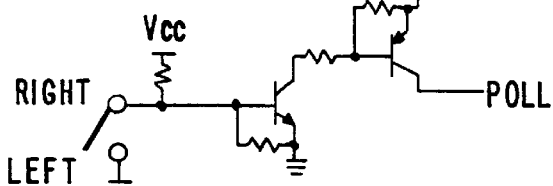
Figure 4B:
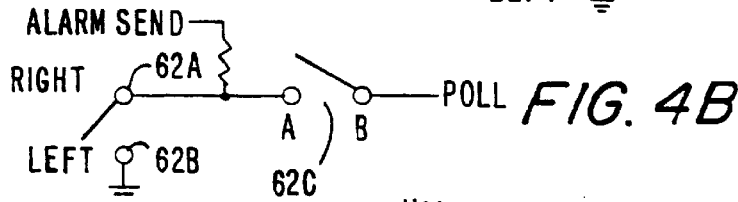

FIGS. 4A–4C are exemplary schematic circuit diagrams of jack input circuit 20 which operate to activate the alarm send function of cellular telephone 10 upon detection of the occurrence of a predetermined (usually undesired) event. For the given exemplary circuits, it is assumed that sensor 50 supplies a short circuit to terminal 20A when the predetermined event has not occurred (i.e., the sensor is not triggered), and supplies an open circuit to input terminal 20A upon detection of the occurrence of the predetermined event (i.e., sensor 50 is triggered). Referring first to FIG. 4A, terminals 60A and 60B are electrically coupled before sensor 50 is triggered thus causing the output of a gate 60D to remain low. In this instance, a polling by controller 12 of jack input circuit 20 (i.e., at the output 60E thereof), results in the non-triggering of the cellular telephone alarm of the present invention. However, when sensor 50 is triggered, an open circuit is supplied to jack input circuit 20 thus causing terminal 60A to be pulled to a high value (by voltage source $V_{cc}$), and gate 60D supplies as its output the "alarm send" signal supplied thereto, which signal represents that cellular telephone 10 is operating in the alarm mode. At this point, controller 12 detects from the output of jack input circuit 20 that sensor 50 is triggered and thereafter operates to call a preprogrammed telephone number, to be further discussed.

FIG. 4B represents another possible circuit of jack input circuit 20 and includes a switch 62C which is closed when jack 52 is inserted into terminal 20A. Thus, the "alarm send" signal is supplied to controller 12 only when jack 52 is inserted into terminal 20A and sensor 50 is triggered (i.e., an open circuit is supplied thus causing terminal 62A and 62B to be electrically opened from one another). FIG. 4C is a further possible circuit of jack input circuit 20 which utilizes transistors to perform the switching. It is noted that while three exemplary circuits have been provided which operate to supply the so-called "alarm" signal to controller 12 when sensor 50 detects the occurrence of a predetermined event, other known circuits may also be utilized.

Upon receipt of the alarm send signal, cellular telephone 10 of the present invention enters an "alarm activate mode" (by means of controller 12) in which a preprogrammed telephone number automatically is called by the cellular telephone and upon establishing a connection with the called number, transmits appropriate information thereto indicating the occurrence of the predetermined event.

Figure 5:
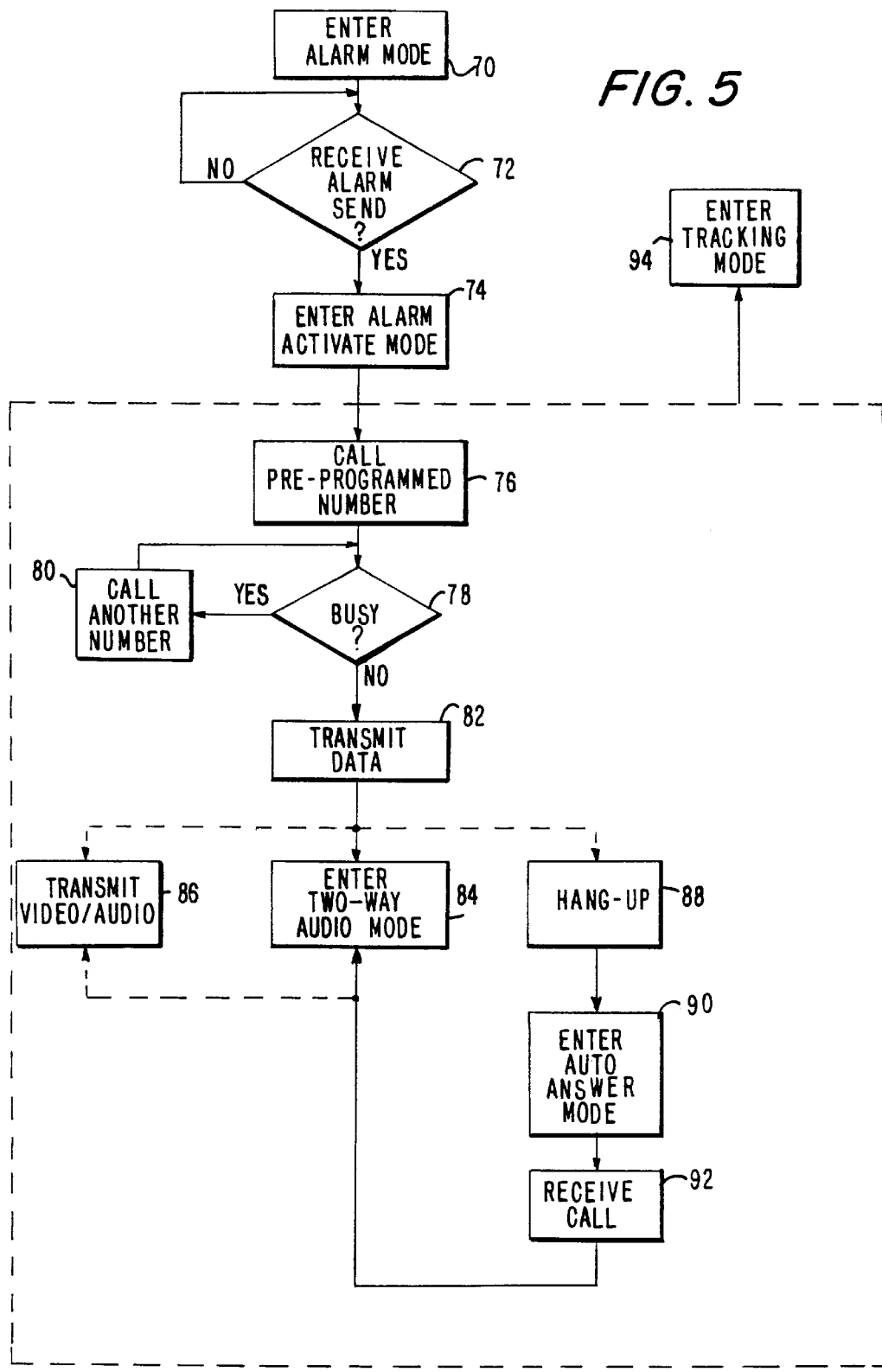
FIG. 5 is a flowchart of the operation of the cellular telephone alarm of the present invention.

Referring to FIG. 5 of the drawings, a flowchart of the operation of cellular telephone 10 operating in the alarm mode of the present invention is provided. Upon initiation by the user (or by inserting jack 52 into input terminal 20A), cellular telephone 10 enters the "alarm mode1" at instruction 70, at which time, the cellular telephone waits or "loops", at inquiry 72 until controller 12 receives or polls an "alarm-send" signal from jack input circuit 20 indicating that the sensor 50 has been triggered (i.e., the predetermined event has occurred). Upon receiving the alarm-send signal, cellular telephone 10 enters the "alarm-activate" mode at instruction 74 and initiates a call to a preprogrammed telephone number at instruction 76. It is determined, at inquiry 78, whether the called number is busy (or does not answer), and if so, a second preprogrammed telephone number is called at instruction 80. If the second called number also is busy (or does not answer), as determined at inquiry 78, then a third preprogrammed telephone number is called at instruction 80. Eventually, it will be determined that the called number receives the call, at inquiry 78, at which time, particular information is transmitted to a receiving device at the called number, at instruction 82. In accordance with the present invention, each of the preprogrammed telephone numbers corresponds to a location at which an alarm system service provider 40 (FIG. 1) is situated, such service provider taking appropriate action that is a function of the transmitted data.

In a preferred embodiment of the present invention, "two-way" audio between cellular telephone 10 and the called telephone number is provided at instruction 84. Entering the "two-way" audio mode, in accordance with the present invention, provides the feature that the alarm system service provider 40 (i.e., the called telephone number) receives the audio that is "picked up" by cellular telephone 10, wherein the supplied audio may be recorded onto a record medium. Thus, any words spoken by, for example, an intruder are recorded by the alarm system service provider, as well as any other sounds that may provide information useful to the owner of the cellular telephone embodying the present invention.

Entering the two-way audio mode further allows for various communication, for example, an active verbal warning, at the location of cellular telephone 10 via its speaker 30 or, alternatively, via a home or car stereo speaker system that is coupled to cellular telephone 10 and which is designed to output an audio transmission that is transmitted to cellular telephone 10 from the alarm system service provider 40.

In an alternative embodiment of the present invention, instead of providing only two-way audio between cellular telephone 10 and the alarm system service provider, cellular telephone 10 may include a video input terminal (not shown) which receives a video source signal supplied from, for example, a video camera that is positioned to pick up a video image of a preselected area such as, for example, the window that is sensed by sensor 50. After establishing communication with the alarm system service provider 40, cellular telephone 10 is operable to transmit both audio and video signals thereto, such signals preferably being recorded on a record medium at the alarm system service provider site (at instruction 86).

In a further alternative embodiment of the present invention, after particular information is transmitted from cellular telephone 10 to alarm system service provider 40 at instruction 82, cellular telephone 10 disconnects the call ("hangs up") at instruction 88 and enters, at instruction 90, an "auto-answer/mute ringer" mode whereupon cellular telephone 10 waits to receive a call from a particular caller, for example, alarm system service provider 40. Then, upon receiving a call, at instruction 92, cellular telephone 10 automatically answers the call, without first ringing (mute mode), and enters the "two-way audio" mode at instruction 84 or, alternatively, transmits audio/video information to the calling party, such as performed at instruction 86. Thus, cellular telephone 10 may be utilized to "eavesdrop" after it receives a call from a particular calling party while in the "alarm mode". Of course, cellular telephone 10 provides a static display 14 during operation in the alarm mode for purposes of discreetness.

As previously discussed, particular information is transmitted to alarm system service provider 40 at instruction 82. Such information may include the telephone number of cellular telephone 10, the status of sensor 50 (i.e., whether triggered or not), the current location of cellular telephone 10 (e.g., the user's home), the desired response of alarm system service provider 40 (e.g., whether the police should be notified, whether another telephone number should be called to notify a third party, etc.). Also, at instruction 82, alarm system service provider 40 may transmit particular information to cellular telephone 10 indicating, for example, whether it should enter the two-way audio mode, whether it should hang up (instruction 88) and will be subsequently called back, etc.

Cellular telephone 10 further is operable to enter a "tracking" mode when it is determined that the telephone has been removed from the premises or, for example, a base in which cellular telephone 10 is inserted, or input jack 52 is removed from terminal 20A of cellular telephone 10. That is, after cellular telephone 10 enters the alarm activate mode when sensor 50 is triggered, it operates in the manner as discussed above with respect to the flowchart of FIG. 5, but it enters a tracking mode when it is apparent that someone (e.g., the intruder) is attempting to terminate the functions of the cellular telephone alarm. For example, when input jack 52 is removed from terminal 20A of cellular telephone 10 during any of instructions/inquiries 76–92 of FIG. 5, a tracking mode is entered at which time cellular telephone 10 calls (or currently is in communication with) alarm system service provider 40, or other appropriate destination (in or beyond the cellular network), and transmits thereto information indicating that the cellular telephone is in the tracking mode, such being performed without knowledge to the appropriator of cellular telephone 10 by muting speaker 30 and providing a static display 14. In this instance, transmission by cellular telephone 10 allows the cellular network to approximate the cellular telephone's position thus allowing the appropriator to be found. As a possible option, cellular telephone 10 can transmit an audio signal upon entering the alarm activation mode to "entice" an appropriation thereof by the intruder.

Figure 6A:
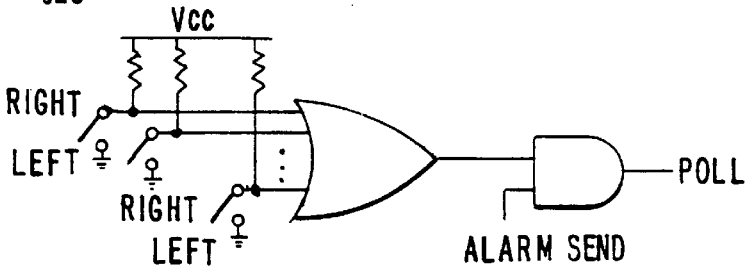
FIG. 6A and 6B are other schematic circuit diagrams of jack input circuit 20 shown in FIG. 1.
Figure 6B:
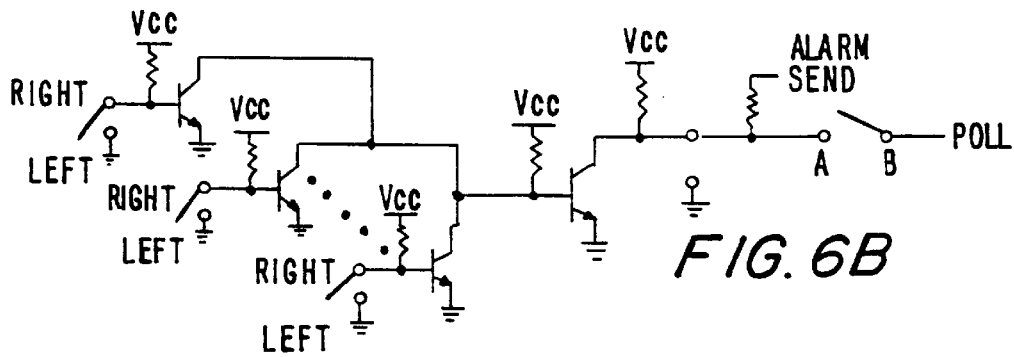

In still yet a further alternative embodiment of the present invention, cellular telephone 10 may include a multiple number of input terminals to which respective sensing devices are coupled, wherein the triggering of any one of the coupled sensing devices causes cellular telephone 10 to enter the alarm activation mode. FIGS. 6A and 6B illustrates exemplary circuit diagrams of jack input circuit 20 in which multiple signals (from the multiple sensors) are supplied thereto and which output the alarm-send signal to controller 12 upon detection of any one of a number of predetermined events. Since the functions and operations of the circuits shown in FIG. 6A and 6B are well-known in the art, a description thereof is omitted herein. Still further, the alarm-send signal supplied to controller 12 may identify which sensor or sensors have been triggered, and this particular information is transmitted, at instruction 82 in FIG. 5, to alarm system service provider 40. Thus, the particular actions of alarm system service provider 40 may depend on the particular information supplied by cellular telephone 10. For example, in response to one particular sensor being triggered, cellular telephone 10 may be controlled to enter the two-way audio mode, and upon the triggering of a different sensor, cellular telephone 10 may be controlled to emit an audio beep (to entice appropriation of cellular telephone 10 by the intruder).

From the foregoing description, it is seen that a relatively low cost alarm system may be provided by means of the use of a cellular telephone operating as an alarm system, wherein most of the functions discussed above are software driven and the hardware requirements of cellular telephone 10 of the present invention are minimal.

While the present invention has been particularly shown and described in conjunction with preferred embodiments thereof, it will be readily appreciated by those of ordinary skill in the art that various changes may be made without departing from the spirit and scope of the invention. For example, although cellular telephone 10 has been described as being coupled to sensor 50 which supplies a sensing signal thereto, the present invention is not limited to wired communication between the sensing device and the cellular telephone and may be in communication with a sensing device in another known manner, for example, such as by infrared or radio signals.

As another example, although the present discussion is directed to a cellular telephone operating as an alarm, the present invention may be applied to other radio communication devices, for example, beepers, PCS devices, etc.

Therefore, it is intended that the appended claims be interpreted as including the embodiments described herein, the alternatives mentioned above, and all equivalents thereto.

What is claimed is:

1. A cellular telephone operable in an alarm mode, comprising:

means for receiving a sensor signal representing an occurrence of a predetermined event;

means for providing said cellular telephone in said alarm mode;

radio communication means for transmitting and receiving radio transmissions to and from a base station of a cellular network to establish channels of communication with called telephone numbers;

control means for controlling, in response to the receipt of said sensor signal representing the occurrence of said predetermined event when said cellular telephone is in said alarm mode, said radio communication means to establish a channel with a predetermined telephone number, and to transmit to said predetermined telephone number identification data identifying said cellular telephone; and for establishing said cellular telephone in a selected operating mode after transmitting said identification data to said predetermined telephone number, wherein said control means is operable to control said radio communication means to disconnect the established channel with said predetermined telephone number and to automatically answer a call from a calling telephone number without ringing, and to establish said cellular telephone in a designated operating mode after the call is automatically answered.

2. The cellular telephone of claim 1, further comprising a microphone for receiving an audio signal; and wherein said control means controls said radio communication means to transmit said audio signal to said calling telephone number.

3. A method of using a cellular telephone as an alarm in an alarm mode, comprising the steps of:

receiving a sensor signal representing an occurrence of a predetermined event;

establishing said cellular telephone in said alarm mode;

establishing, in response to the receipt of said sensor signal representing the occurrence of said predetermined event when said cellular telephone is in said alarm mode, a radio channel with a predetermined telephone number;

transmitting to said predetermined telephone number identification data identifying said cellular telephone; and establishing said cellular telephone in a selected operating mode after said identification data is transmitted to said predetermined telephone number;

disconnecting the established channel with said predetermined telephone number;

automatically answering a call from a calling telephone number without ringing; and establishing said cellular telephone in a designated operating mode after the call is automatically answered.

4. The method of claim 3, further comprising the step of transmitting to said calling telephone number an audio signal received from a microphone of the cellular telephone after the call is automatically answered.

* * * * *